United States Patent [19]

Moulin

[11] Patent Number: 4,749,251

[45] Date of Patent: Jun. 7, 1988

[54] CONNECTOR LOCKING SYSTEM

[75] Inventor: Norbert L. Moulin, Placentia, Calif.

[73] Assignee: Hughes Aircraft Company, Los Angeles, Calif.

[21] Appl. No.: 754,383

[22] Filed: Jul. 11, 1985

[51] Int. Cl.[4] .................................... G02B 6/36

[52] U.S. Cl. .................... 350/96.20; 350/96.10; 339/312; 339/336; 81/124.2

[58] Field of Search ............ 350/96.20, 96.21, 96.22; 339/89 R, 89 M; 81/124.2, 121.2

[56] References Cited

U.S. PATENT DOCUMENTS

| | | | |
|---|---|---|---|
| 2,784,385 | 3/1957 | Ennis | 339/89 |
| 3,086,414 | 4/1963 | Nardi | 81/124.2 X |
| 3,613,047 | 10/1971 | Mira | 339/89 R |
| 3,971,614 | 7/1976 | Paoli et al. | 339/89 R |
| 4,030,798 | 6/1977 | Paoli | 339/89 R |
| 4,125,913 | 11/1978 | Lewis | 81/124.2 X |
| 4,247,164 | 1/1981 | Mannschke | 350/96.21 |
| 4,255,016 | 3/1981 | Borsuk | 350/96.21 |
| 4,441,775 | 4/1984 | Walters | 339/89 R |
| 4,459,716 | 7/1974 | Valadez | 81/121.2 X |
| 4,484,790 | 11/1984 | Schildkraut et al. | 339/89 M |
| 4,508,407 | 4/1985 | Ball | 339/89 R |
| 4,552,427 | 11/1985 | Landgreen | 339/89 M |
| 4,588,245 | 5/1986 | Schwartz et al. | 339/89 R |

FOREIGN PATENT DOCUMENTS

| | | | |
|---|---|---|---|
| 0102679 | 3/1984 | European Pat. Off. | 339/89 R |
| 2644573 | 4/1978 | Fed. Rep. of Germany . | |
| 3223109 | 12/1983 | Fed. Rep. of Germany | 81/124.2 |

*Primary Examiner*—William L. Sikes
*Assistant Examiner*—Akm E. Ullah
*Attorney, Agent, or Firm*—Joseph E. Szabo; Anthony W. Karambelas

[57] ABSTRACT

A fiber optic modular connector system is disclosed which includes a receptacle connector (30) and a locking leaf spring (17) having a locking tang (17c) mounted on the receptacle connector. The connector system further includes a removable plug connector housing (19) carrying a rotatable coupling ring (23) for selective coupling with the receptacle connector. The coupling ring includes external splines (25) for accepting a connector installation and removal tubular wrench (50), and further includes a plurality of notches (27) for cooperating with the locking leaf spring to provide a ratchet mechanism. The notches on the coupling ring and the locking leaf spring on the receptable connector allow the coupling ring to be rotated in a first direction, and prevent rotation in a second direction when the locking tang of the leaf spring is engaged with one of the notches on the coupling ring.

The disclosed connector system further includes a connector installation and removal tubular wrench (50) which has an elongated housing (35) and an internally splined socket (39) for selectively meshing with and engaging the external splines of the plug connector coupling ring. An elongated slot (47) extending from the end of the socket along the housing is provided to allow the tubular wrench to be placed over a removable plug connector having a fiber optic cable connected thereto.

7 Claims, 2 Drawing Sheets

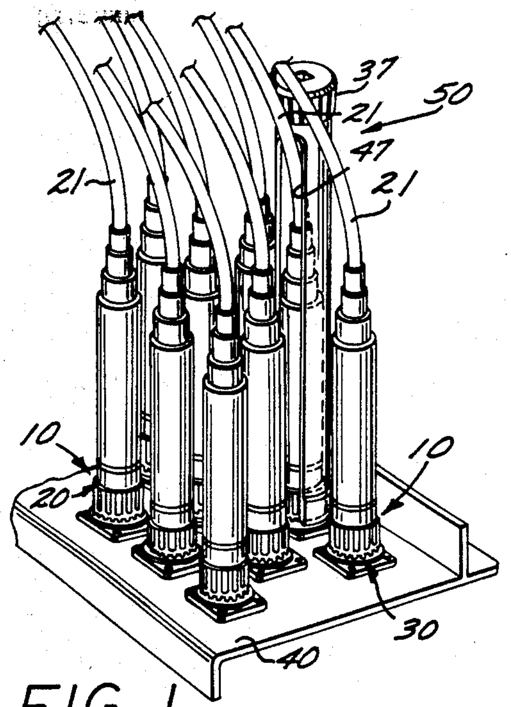
FIG. 1
FIG. 2
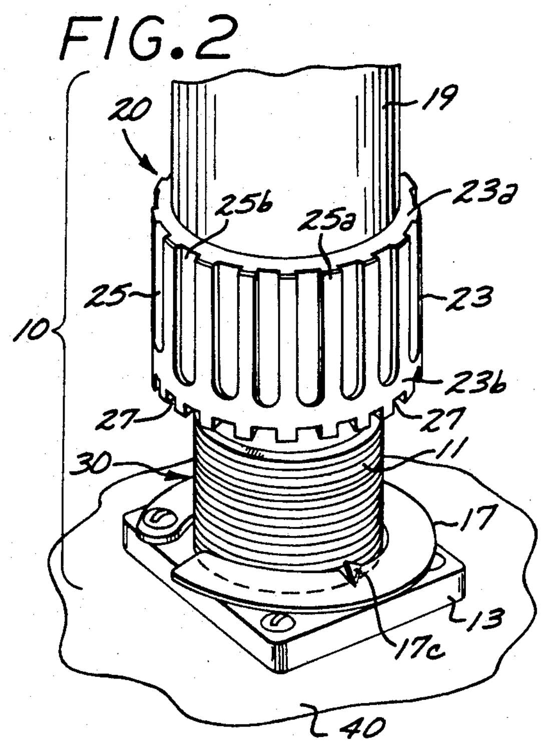
FIG. 6
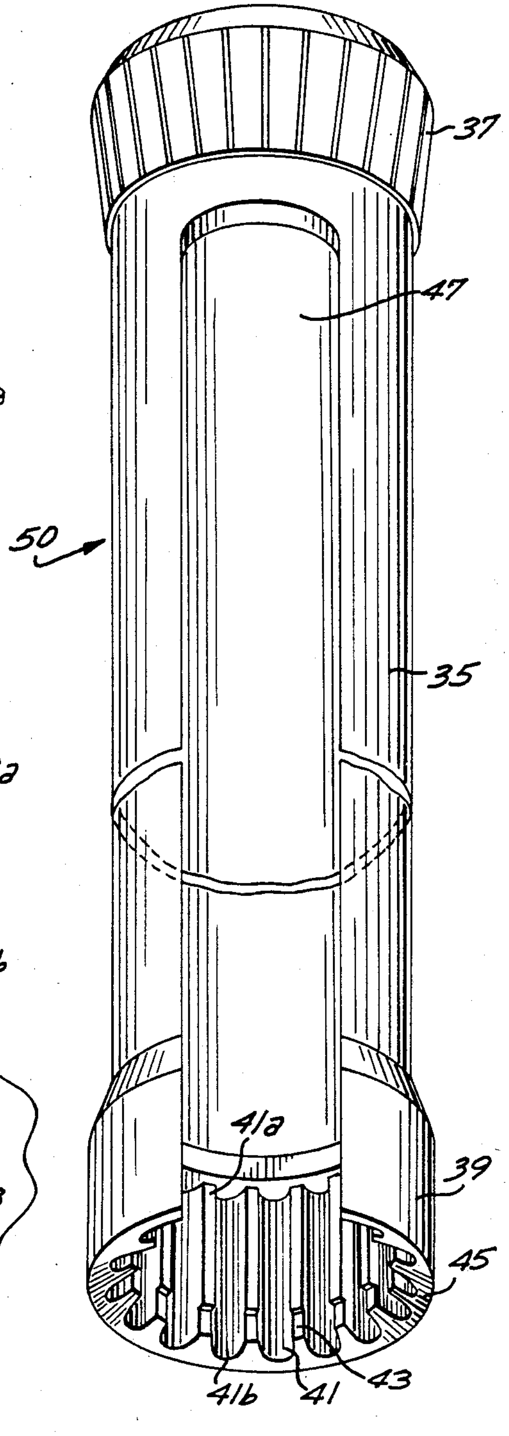

CONNECTOR LOCKING SYSTEM

BACKGROUND OF THE INVENTION

The disclosed invention generally relates to plug connector systems, and is more specifically directed to a fiber optic modular connector system for connecting multiple fiber optic conductors.

With the development of the fiber optic components and application techniques, the utilization of fiber optics for communicating signals has increased considerably. For example, the use of fiber optic conductors is particularly advantageous in systems where the interference caused by traditional electrical conductors is undesirable or cannot be tolerated.

In applications where more than a few fiber optic conductors are utilized, removable modular connection of fiber optic conductors is often desirable. Known fiber optic modular connector systems typically include a receptacle connector which is fixedly attached to a wall, bulkhead, shelf or the like. The receptacle connector includes a plurality of terminated fiber optic conductors, and further includes external threads. The receptacle connector receives a selectively removable plug connector which includes a plurality of terminated fiber optic conductors. The removable plug connector further includes a coupling ring having internal threads for engaging the external threads of a a mating receptacle connector. The coupling ring is typically intended to be tightened or loosened by hand. The receptacle connector and the removable plug connector may further include respective bores for accepting a safety wire which is inserted and secured after the plug connector is tightened on the receptacle connector.

In typical installations of known modular fiber optic connector systems, numerous receptacle connectors are closely spaced in a small area which may be a confined area. Initial installation of the mating plug connectors is generally straight forward and, for example, may be accomplished by sequentially securing the connectors, starting wtih those furthest from the access area. However, removal of selected installed removable plug connectors may be more difficult, particularly those connectors which are furthest from the access area which may include some plug connectors adjacent confining walls. The removal of such confined plug connectors may involve the initial removal of confining plug connectors.

It should be apparent the removal and replacement of selected plug connectors with known fiber optic modular connector systems can be very tedious and time consuming, particularly if safety wires are also utilized. Additionally, the often necessary removal of plug connectors solely to provide access provides the potential for errors in reinstallation. The potentially tedious and time consuming task of removing and reinstalling many plug connectors has led to shortcuts, such as not removing all confining plug connectors or the inappropriate use of pliers, wrenches and the like to avoid removal of confining plug connectors. The results include malfunction or damaged connectors, which then results in other time consuming tasks such as identifying the causes of malfunction and replacing damaged connectors.

Known fiber optic modular connector systems are generally based on electrical modular connectors wherein the precise alignment of the mating conductors is not as critical. In electrical connectors, the mating conductors typically include mating pins and sockets. Therefore, electrical conductivity is achieved even if an electrical plug connector is not tightly fastened. However, fiber optic connectors must be fully engaged since the mating optical conductors must be precisely aligned and in contact or spaced apart by a predetermined distance. Fiber optic connectors which are not fully engaged may very well result in poor performance.

SUMMARY OF THE INVENTION

It would therefore be an advantage to provide a fiber optic modular connector system having removable plug connectors and which allows for simple and reliable replacement of installed plug connectors.

It would also be an advantage to provide a fiber optic modular connector system which allows for easy selective removal of a selected plug connector without removing adjacent plug connectors.

Another advantage would be to provide a fiber optic modular connector system having removable plug connectors which may be reliably secured.

Still another advantage would be to provide a fiber optic modular connector system having removable plug connectors which may be reliably secured without the use of safety wires.

A further advantage would be to provide a fiber optic modular connector system which achieves reliable alignment of optical conductors.

It would also be an advantage to provide a fiber optic modular connector system which includes a connector installation and removal wrench which does not damage the plug connectors and which allows for removal of a selected plug connector without removing adjacent plug connectors.

Another advantage would be to provide a fiber optic modular connector system which can be readily retrofitted to existing fiber optic connector systems.

The foregoing and other advantages and features are provided in the disclosed fiber optic modular connector system of the invention which includes a receptacle connector; and a removable plug connector housing having a coupling ring for selective coupling with the receptacle connector. The coupling ring includes external splines for accepting a tubular connector installation and removal wrench. The receptacle connector and coupling ring further include a locking structure for cooperatively allowing relative rotation in a first direction between the coupling ring and the receptacle connector, and for preventing relative rotation in a second direction between the coupling ring and the receptacle connector when the locking means is enabled The disclosed connector system further includes a tubular connector installation and removal wrench which has an internally splined socket at the end of an elongated housing. An elongated slot extending from the end of the socket along the housing is provided to allow the tubular wrench to be placed over a removable plug connector having a fiber optic cable connected thereto.

BRIEF DESCRIPTION OF THE DRAWING

The advantages and features of the disclosed invention will readily be appreciated by persons skilled in the art from the following detailed description when read in conjunction with the accompanying drawing wherein:

FIG. 1 is a perspective view illustrating a typical installation of the disclosed fiber optic modular connector system.

FIG. 2 is a partial perspective view showing the receptacle connector and the removable plug of the disclosed connector system, wtih the plug connector unmated.

FIG. 6 is a perspective view of the tubular connector installation and removal wrench of the disclosed connector system.

DETAILED DESCRIPTION OF THE DISCLOSURE

Figure 3:
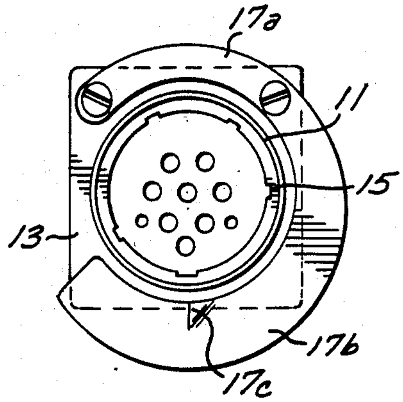
FIG. 3 is a plan view of the receptacle connector of the disclosed connector system.
Figure 4:
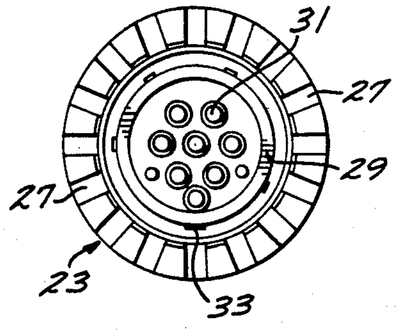
FIG. 4 is a plan view of the removable plug connector of the disclosed connector system.

In the following detailed description and in the several figures of the drawing, like elements are identified with like reference numerals.

Referring now to FIG. 1, generally shown therein is a group of fiber optic modular connectors 10 which utilize the connector system of the invention. Each modular connector 10 includes a removable plug connector 20 which is intended to be selectively coupled with a receptacle connector 30. As shown in FIG. 1, a plurality of receptacle connectors 30 are typically mounted in closed proximity to each other on a mounting surface such as a wall, shelf, bulkhead, or the like. Such mounting surface is generally identified with the reference numeral 40.

Referring now to FIGS. 2 and 3, the receptacle connector 30 includes an externally threaded cylindrical boss 11 which is secured to a base flange 13. By way of example, the external threads on the boss 11 have a right hand sense. The boss 11 includes internal axial grooves 15 which function as alignment grooves. The alignment grooves 15 are preferably sized and located so that a mating component can be inserted only in a predetermined alignment orientation. Terminated fiber optic conductors (not shown) are appropriately secured in a standard manner within the threaded boss 11.

By way of example, the base flange 13 has a generally square outside perimeter with slightly rounded corners. With that shape, the base flange 13 may include bores which accept threaded fasteners for securing the receptacle connector 30 to the mounting surface 40.

The receptacle connector 30 further includes a locking leaf spring 17 which roughly resembles a portion of a turn of a helix and partially surrounds the threaded boss 11. The locking leaf spring 17 includes a fixed portion **17*a* which is secured to the base flange 13. By way of example, the fixed portion 17*a* of the leaf spring 17 may be secured by two of the threaded fasteners which secure the base flange 13 to the mounting surface 40**.

The leaf spring 17 further includes a deflectable portion **17*b* which spirals upwardly in a clockwise direction. As shown, the width of the leaf spring 17 increases with displacement from the fixed end to the other end. A locking tang 17*c* formed at the inside edge of the the deflectable portion 17*a* of leaf spring 17. The locking tang 17*a* slants upwardly in a clockwise direction, which is based on having right-hand threads on the externally threaded boss 11. As discussed more fully below, the leaf spring 17 cooperates with the removable plug connector 20 to prevent unwanted loosening of the plug connector 20 from the receptacle connector 30**.

Referring now also to FIGS. 2 and 3, the removable plug connector 20 includes a cylindrical housing 19 which accepts a fiber optic cable 21 that contains a plurality of fiber optic conductors (not shown). The removable plug connector 20 further includes a rotatable cylidrical coupling ring 23 which is rotatably attached at one end of the housing 19 to allow rotation and to prevent axial displacement relative to the housing 19, except perhaps for a slight amount of axial play. The coupling ring 23 has a housing end **23*a* adjacent the plug connector housing 19 and a mating end 23*b*, and further includes external splines 25 about its periphery. The splines 25 include ribs 25*a* and grooves 25*b*. The grooves 25*b* of the splines 25 extend axially from the housing end 23*a* of the coupling ring 23 toward the mating end 23*b*, but do not extend completely to the mating end 23*b*. The coupling ring 23 also includes internal right hand threads which correspond to the external threads of the boss 11. Radially extending notches 27 are uniformly distributed about the base of the coupling ring 23**.

The plug connector 20 further includes a cylindrical inner sleeve 29 which supports a plurality of fiber optic terminations 31 in a standard manner. The inner sleeve 29 includes a plurality of radially extending key protrusions 33 which correspond to the grooves 15 in the boss 11 of the receptacle connector 30. The key protrusions 33 and the grooves 15 cooperate to insure that the plug connector 20 is properly aligned rotationally with the receptacle connector 30.

In use, the inner sleeve 29 of the plug connector 20 is properly aligned with the boss 11 of the receptacle connector 30 and inserted therein. While pressing the plug connector 20 against the receptacle connector 30, the coupling ring 23 is rotated clockwise so that the internal threads of the coupling ring 23 engage the external threads of the boss 11.

Figure 5:
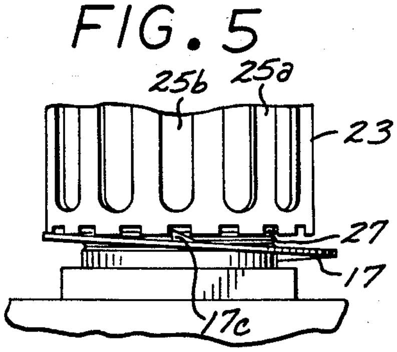
FIG. 5 is an elevational view showing the locking structures of the disclosed connector system.

Continued clockwise rotation of the coupling ring will drive the coupling ring 23 and the plug connector housing 19 toward the base flange 13. As the coupling ring 23 approaches the base flange 11, the notches 27 will come into contact with the locking tang **17*c* of the leaf spring 17, as shown in FIG. 5. However, the slant direction of the tang 17*c* allows the coupling ring 23 to be tightened in the clockwise direction as desired. Such tightening causes the leaf spring 17 to be deflected toward the base flange 11. Preferably, when the coupling ring 23 is sufficiently tightened, it should be positioned so that the locking tang 17*c* engages one of the notches 27. That can be readily accomplished by rotating the coupling ring 23** slightly in either direction as required.

It should be evident that the locking tang **17*c* will allow clockwise rotation of the coupling ring 23, but will prevent counterclockwise rotation of the coupling ring 21 so long as the locking tang 17*c* is engaged in one of the notches 27. Thus, the locking tang 17*c* of the leaf spring 17 and the notches 27 of the coupling ring 23 cooperatively function as a safety lock to prevent inadvertent loosening of the coupling ring 23** from shock, vibration, and other deflective forces. Effectively, the leaf spring 17 and the notches 27 cooperate as a ratchet mechanism.

The plug connector 20 is unmated by deflecting the leaf spring 17 to prevent the locking tang 17*c* from engaging the notches 27, and rotating the coupling ring 23 in the counterclockwise direction.

Although the foregoing described modular connector 10 includes the leaf spring 17 and the notches 27 which together function as locking structures, some applications may not require safety locking and the leaf spring 17 and/or the notches 27 may be eliminated for such applications.

The rotation of the coupling ring 23 and any necessary deflection of the leaf spring 17 may be accomplished by hand, or with the connector wrench 50 shown in FIG. 6. The connector wrench 50 includes an elongated cylindrical body 35 which has a handle portion 37 at one end and a socket 39 at the other end. The socket 39 includes axially extending internal splines 41 which particularly include ribs 41*a* and grooved 41*b* that extend toward the end of the socket 39. The spline ribs 41*a* uniformly terminate at an annular cutout 43 which axially merges with a chamfered shoulder 45.

The internal splines 41 are adapted to mesh with and engage the external splines 25 on the coupling ring 23 of the removable plug connector 20. The annular cutout 43 and the chamfered shoulder 45 allow the socket 39 to be placed over the plug connector coupling ring 23 so that the end of the shoulder 45 extends beyond the mating end 23*b* of the coupling ring 23 when the ends of the spline ribs 41*a* of the socket 39 contact the ends of the spline grooves 25*b* of the coupling ring 23.

An elongated slot 47 begins at the end of the socket 39 and extends for a large portion of the length of the elongated cylindrical body 35 of the wrench 50. As discussed more fully herein, the elongated slot 43 allows the wrench 50 to be slipped over the fiber optic cable 21 and the plug connector 20 to engage the coupling ring 23 of the plug connector 20.

The wrench 50 may be used (1) to initially couple a plug connector 20 with a receptacle connector 30, (2) to tighten a plug connector 20 which is partially engaged with the receptacle connector 30, or (3) to loosen or remove a plug connector 20 from a receptacle connector 30.

Figure 7:
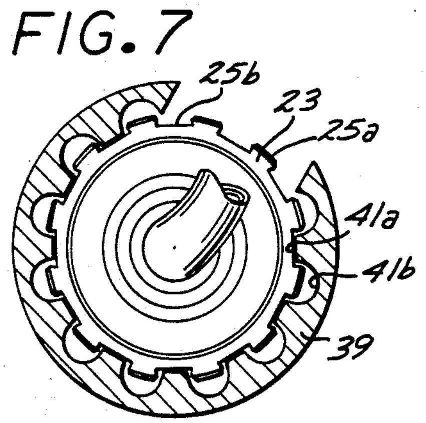
FIG. 7 is a partial sectional view illustrating the engagement of the tubular connector wrench of FIG. 6 with the removable plug connector of the disclosed connector system.

For initially coupling the plug connector 30, the elongated slot of the wrench 50 is placed over the fiber optic cable 21 with the socket 39 toward the plug connector housing 19. The wrench 50 is then slipped over the plug connector housing 19 toward the plug connector coupling ring 23 so that the socket splines 41 of the wrench 50 slidably mesh with and engage the splines of the plug connector coupling ring 23, as shown in FIG. 7. The travel of the socket 39 on the coupling ring 23 is limited by the terminations of the spline grooves 25*b* on the coupling ring 23. Engagement of the socket splines 41 with the coupling ring splines 25 interlocks the socket 39 with the coupling ring 23 so that turning the tubular wrench 50 causes the coupling ring 23 to rotate with the socket 39.

The plug connector/wrench assembly thus formed is then positioned so that the threads of the coupling ring 23 engage the threads of the receptacle connector boss 11, and the wrench 50 is appropriately rotated to obtain the desired tightness.

As discussed previously, the elongated slot 47 allows the wrench 50 to be placed over the plug connector to bring the socket 39 into engagement with the plug connector coupling ring 23. Additionally, the elongated slot 47 allows the wrench 50 to be rotated without twisting the fiber optic cable 21. Effectively, the cable 21 will be displaced along a somewhat circular path, but will not be twisted.

For tightening a plug connector 20 which is partially engaged with a receptacle connector 30, the wrench 50 is placed on the plug connector 20 in substantially the same manner described above. Once the socket 39 has engaged the coupling ring 23, the wrench is rotated as required to obtain the desired tightness.

Figure 8:
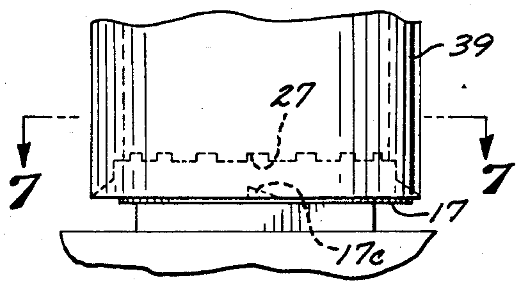
FIG. 8 is an elevational view illustrating the use of the tubular wrench of FIG. 6 for disengaging the locking structures of the disclosed connector system.

For loosening a tightened plug connector 20, the wrench socket 39 is placed over the coupling ring 23 as described previously. Sufficient force is then applied to cause the socket shoulder 43 to deflect the leaf spring 17 and the locking tang 17*c* away from the notches 27 of the coupling ring 23, as shown in FIG. 8. While applying such pressure, the wrench 50 is rotated in the appropriate direction to uncouple the couping ring 23 from the boss 11.

It should be noted that the combined axial depth of the socket shoulder 45 and the annular cutout 43 should be sufficiently greater than the distance between the ends of the spline grooves 25*b* and the terminal portion of the mating end 23*b* of the coupling ring 23, so as to allow sufficient deflection of the leaf spring 17 to isolate the locking tang 17*c* from the notches 27 of the coupling ring 23.

As a further feature of the connector wrench 50, it can be implemented as a torque wrench. For example, an appropriate torque sensitive mechanism, such as a clutch, may be included within the housing 35 or the handle 37. The housing 35 and the handle 37 would be coupled to each other via such torque sensitive mechanism so that the housing 35 and the handle 37 would rotate in unison so long as the torque between the housing 35 and the handle 37 does not exceed a predetermined level. If the torque between the housing and the handle 37 exceeds such predetermined level, the handle 37 would rotate relative to the housing 37. Thus, the amount torque which would be applied to tightening the plug connector 20 would limited. Such torque limiting may be desirable in certain fiber optic applicatios where over-tightening may damage the fiber optic terminations in the plug connector 20 and/or in the receptacle connector 30.

While the foregoing described connector system includes a tubular wrench 50 for selectively engaging a splined coupling ring 23, some applications may not require the tubular wrench 50. In that circumstance, the splines 25 on the coupling ring 23 may not be necessary.

The disclosed modular fiber optic connector system may be readily retrofitted to existing fiber optic connector systems, such the connector systems which meet Mil Spec MILC 28876. For example, the splined coupled ring 23 would replace the coupling ring of a plug connector, and if required the locking leaf spring 17 would be secured to a receptacle connector.

The foregoing described connector system provides for the efficient and reliable installation and removal of removable plug connectors, and is particularly advantageous in confined area installations. The disclosed connector system further provides, if desired, for secure locking of an installed plug connector without the use of locking wires.

Although the foregoing has been a description and illustration of specific embodiments of the invention, various modifications and changes thereto can be made by persons skilled in the art without departing from the scope and spirit of the invention as defined by the following claims.

What is claimed is:

1. A connector system comprising:
a receptacle connector;
a removable plug connector housing;
a coupling ring rotatably mounted on said plug connector housing for selective coupling with said receptacle connector;
interlocking means about said coupling ring to render said coupling ring selectively engageable by a tubular wrench;
locking means on said receptacle connector and said coupling ring for cooperatively allowing relative rotation in a first direction between said coupling ring and said receptacle connector, and for preventing relative rotation in a second direction between said coupling ring and said receptacle connector when said locking means is enabled; and
a tubular wrench having:
an elongated cylindrical housing;
a socket at one end of said housing for selectively engaging said interlocking means about said coupling ring and further having unlocking means for disabling said locking means, said interlocking means about said coupling ring comprising means about said coupling ring for slidably engaging said tubular wrench socket, and said socket including means for meshing with said slidably engaging means about said coupling ring to provide a rotationally interlocked engagement between said tubular wrench and said coupling ring; and
an elongated slot axially extending from the end of said socket along said housing.

2. The connector system of claim 1 wherein said slidably engaging means about said coupling ring comprises external splines, and wherein said meshing means of said tubular wrench socket comprises internal splines.

3. A connector system comprising:
a receptacle connector;
a removable plug connector housing;
a coupling ring rotatably mounted on said plug connector housing for selective coupling with said receptacle connector;
interlocking means about said coupling ring to render said coupling ring selectively engageable by a tubular wrench;
locking means on said receptacle connector and said coupling ring for cooperatively allowing relative rotation in a first direction between said coupling ring and said receptacle connector, and for preventing relative rotation in a second direction between said coupling ring and said receptacle connector when said locking means is enabled, said locking means including a plurality of notches on one end of said coupling ring and a leaf spring having a locking tang on said receptacle connector; and
a tubular wrench having:
an elongated cylindrical housing;
a socket at one end of said housing for selectively engaging said interlocking means about said coupling ring and further having unlocking means for disabling said locking means, said tubular wrench unlocking means comprising a shoulder at the end of said socket for deflecting said leaf spring; and
an elongated slot axially extending from the end of said socket along said housing.

4. A connector system comprising:
a receptacle connector;
a removable plug connector housing;
a coupling ring rotatably mounted on said plug connector housing for selective coupling with said receptacle connector; and
interlocking means about said coupling ring to render it selectively engageable by a tubular wrench, said tubular wrench having:
an elongated cylindrical housing;
a socket at one end of said housing for engaging said interlocking means of said coupling ring, said interlocking means comprising means for slidably engaging said tubular wrench socket; and
an elongated slot axially extending from the end of said socket along said housing, said tubular wrench socket including means for meshing with said slidably engaging means about said coupling ring to provide a rotationally interlocked engagement between said tubular wrench and said coupling ring.

5. The connector system of claim 4 wherein said slidably engaging means about said coupling ring comprises external splines, and wherein said meshing means of said tubular wrench socket comprises internal splines.

6. For use with a removable plug connector having a housing and a coupling ring rotatably mounted on said housing for selectively coupling said plug connector to a receptacle connector which mates with said plug connector, a tubular wrench comprising:
an elongated cylindrical housing;
a socket at one end of said housing for engaging said plug connector coupling ring so that turning of said tubular wrench causes the coupling ring to turn, said socket including means for meshing with the plug connector coupling ring to provide a rotationally interlocked engagement between said socket and the plug connector coupling ring; and
an elongated slot axially extending from the end of said socket along said housing.

7. The tubular wrench of claim 6 wherein said meshing means of said socket includes internal splines.

* * * * *